(12) United States Patent
Sneddon et al.

(10) Patent No.: US 8,075,763 B2
(45) Date of Patent: Dec. 13, 2011

(54) PROCESS FOR TREATING AGED CRUDE OIL RESIDUE

(75) Inventors: Andrea Sneddon, Merseyside (GB); Jenny-Ann Ostlund, Stafford (GB)

(73) Assignee: Innospec Limited (GB)

( * ) Notice: Subject to any disclaimer, the term of this patent is extended or adjusted under 35 U.S.C. 154(b) by 643 days.

(21) Appl. No.: 12/158,830

(22) PCT Filed: Dec. 21, 2006

(86) PCT No.: PCT/GB2006/004834
§ 371 (c)(1),
(2), (4) Date: Jun. 23, 2008

(87) PCT Pub. No.: WO2007/072005
PCT Pub. Date: Jun. 28, 2007

(65) Prior Publication Data
US 2008/0296202 A1   Dec. 4, 2008

(30) Foreign Application Priority Data

Dec. 23, 2005 (GB) .................................. 0526418.9

(51) Int. Cl.
*C10L 1/00* (2006.01)

(52) U.S. Cl. .......... 208/255; 208/44; 208/179; 507/220; 516/183

(58) Field of Classification Search ............ 208/44, 208/179, 255, 299, 309, 310 R; 507/220; 516/183
See application file for complete search history.

(56) References Cited

U.S. PATENT DOCUMENTS

| | | | | |
|---|---|---|---|---|
| 2,524,864 A | * | 10/1950 | Glendenning et al. | 44/374 |
| 4,264,334 A | | 4/1981 | Durand et al. | 44/62 |
| 4,897,205 A | | 1/1990 | Landry | 210/766 |
| 4,990,237 A | | 2/1991 | Heuer et al. | 208/13 |
| 5,021,498 A | | 6/1991 | Stephenson et al. | 524/484 |
| 5,100,531 A | * | 3/1992 | Stephenson et al. | 208/22 |
| 5,354,504 A | | 10/1994 | Rivas et al. | 252/314 |
| 6,120,678 A | * | 9/2000 | Stephenson et al. | 208/188 |
| 2004/0035749 A1 | | 2/2004 | Khan et al. | 208/106 |

FOREIGN PATENT DOCUMENTS

| | | |
|---|---|---|
| CA | 2029465 | 2/2002 |
| CA | 2075749 | 11/2004 |
| GB | 0526418.9 | 12/2005 |
| WO | WO 02/10293 | 2/2002 |

OTHER PUBLICATIONS

Sinnott, R.K. (1999). Chemical Engineering Design, 4th ed. Butterworth-Heinemann, 1038 pgs. (Office action cites p. 402).*
International Preliminary Report on Patentability; International Application No. PCT/GB2006/004834; Date of Issuance of Report, Jun. 24, 2008; Written Opinion of the International Search Authority; International Application No. PCT/GB2006/004834.
International Search Report; International Application No. PCT/GB2006/004834; Apr. 18, 2007.

* cited by examiner

*Primary Examiner* — Robert J Hill, Jr.
*Assistant Examiner* — Brian McCaig
(74) *Attorney, Agent, or Firm* — Burns & Levinson, LLP; Janine M. Susan, Esq.

(57) ABSTRACT

The present invention provides a process for the treatment of crude oil or aged crude oil residue comprising the steps of (a) contacting the oil or residue with a phenol resin and with a diluent, to provide a diluted phenol resin treated oil or residue; and (b) optionally removing solid material from the diluted phenol resin treated oil or residue.

28 Claims, No Drawings

PROCESS FOR TREATING AGED CRUDE OIL RESIDUE

CROSS REFERENCE TO RELATED APPLICATIONS

This application claims priority to the following International Applications all by the current inventors Andrea Sneddon, et al: International Application No. PCT/GB2006/004834, entitled PROCESS; filed Dec. 21, 2006; and GB 0526418.9 entitled PROCESS, filed on Dec. 23, 2005, all of which are incorporated herein by reference in their entirety.

The present invention relates to a process for the treatment of crude oil or aged crude oil residue. The process mobilises crude oil or aged crude oil residue allowing it to be used to provide saleable stable heavy fuel oil blend.

FIELD OF INVENTION

The present invention relates to the use of additives to allow crude oil or aged waste crude oil residue to be mixed with lighter hydrocarbon streams to provide saleable stable heavy fuel oil blends. These may be used in furnace applications, boiler fuel, marine fuel, bunker fuel or blending components for bunker fuel, or bitumen.

The presence of the additive makes it possible to dilute the oil or waste residue with lighter components that may otherwise have caused flocculation of asphaltenes and subsequent separation of the product into two phases. Asphaltene flocculation causes problems such as sludge in tanks, slag in separators, plugging of filters, deposits on heaters and incomplete combustion.

The addition of additives resulted in an improved stability reserve, for example as measured by a Turbiscan using ASTM D7061, of the aged waste crude oil allowing it to be mixed with lighter fractions without phase separation occurring.

BACKGROUND

Finding a method to use refinery or other petroleum based wastes is a considerable problem. Currently available processes can be costly, time consuming and inefficient. A number of processes to do this have been described in the prior art.

U.S. Pat. No. 4,990,237 discloses a method for oil recovery from waste oil sludge by centrifugation, volatilisation, condensation and separation by settling.

U.S. Pat. No. 4,897,205 covers the treatment of petroleum sludge by use of steam and a re-circulating solvent to decrease viscosity followed by separation of the solid and liquid components by settlement. Further examples are provided in WO 02/10293.

Asphaltenes are constituents of crude oils. They contain a multiplicity of structures, especially high molecular weight, fused aromatic components and may contain heteroatoms such as O, N or and/or S. As they are very complex, asphaltenes are generally defined in terms of solubility, e.g. soluble in benzene but not in n-pentane.

Asphaltenes can precipitate and be potentially problematical during production, refining, transport and storage of crude oil and products derived from crude oil, for example heavy fuel oil, residual fuel oil, Bunker C or marine fuel.

Depending on the final use of the oil problems can occur due to precipitation of asphaltenes in valves and pipes and on hot surfaces such as heat exchangers. In ships precipitation of asphaltenes can lead to poor combustion, handling and storage problems.

To reduce the viscosity of heavy and residual fuel oils dilution with solvent is sometimes used. Here too handling and storage of the oils can be disrupted by asphaltene precipitation.

Asphaltene dispersants for use in the above applications are already known. For example CA 2029465 and CA2075749 describe alkylphenol-formaldehyde resins in combination with hydrophilic-lipophilic vinyl polymers.

The present invention alleviates the problems of the prior art.

In one aspect the present invention provides a process for the treatment of crude oil or aged crude oil residue comprising the steps of (a) contacting the oil or residue with a phenol resin and with a diluent, to provide a diluted phenol resin treated oil or residue; and (b) optionally removing solid material from the diluted phenol resin treated oil or residue.

In one aspect the present invention provides a treated crude oil or treated aged crude oil residue prepared by a process as defined herein.

In one aspect the present invention provides a residual fuel oil, boiler fuel, marine fuel, Bunker C, blending components for bunker fuel or bitumen comprising a treated crude oil or a treated aged crude oil residue prepared by a process as defined herein.

In one aspect the present invention provides use of a phenol resin for increasing the stability of a crude oil or an aged crude oil residue.

Further aspects of the invention are defined in the appended claims.

Surprisingly in an application to recover residual fuel oil from crude oil or aged crude oil residue (residual pitch) it has been found that the use of additives during the process makes it possible to dilute the crude oil or aged crude oil residue with lighter components that would otherwise have caused flocculation of asphaltenes. The inclusion of additives enables the production of saleable stable heavy fuel oil blends from these types of material.

It is understood that the phenol resin improves the stability reserve of the oil or residue compatibility and/or the compatibility between asphaltenes and the oil or residue. In particular it is believed that the addition of the phenol resin as require by the present invention may increase the compatibility of the "heavy fuel oil" components of the residue with other components such as the diluent. Consequently on addition of the diluent to the residue no problems are observed. In contrast stability problems were observed when the residue without additives was blended with diluent, such as a lighter feed stock.

Crude Oil

It will be understood that by the term "crude oil" it is meant unrefined crude oil. That is crude oil containing all fractions thereof.

In one aspect the crude oil is heavy crude oil. Heavy crude oil is understood to mean crude oil having an API gravity of less than 28 degrees.

API gravity is the gravity or density of liquid petroleum products devised jointly by the American Petroleum Institute and the National Bureau of Standards. The measuring scale is calibrated in terms of degrees API. The formula for determining API Gravity is as follows:

$$\text{Degrees API Gravity} = (141.5/\text{Specific Gravity at } 60° \text{ F.}) - 131.5$$

Thus in a further aspect the present invention provides a process for the treatment of heavy crude oil or aged crude oil residue comprising the steps of (a) contacting the heavy crude oil or residue with a phenol resin and with a diluent, to provide a diluted phenol resin treated heavy crude oil or residue; and (b) optionally removing solid material from the diluted phenol resin treated heavy crude oil or residue.

Aged Crude Oil Residue

The aged crude oil residues may be any residual component from crude oil refining which have been aged by subsequent storage in the presence of air.

A typical residual component is atmospheric residue, the residual component from crude distillation, which has a boiling range starting from around 350° C.

Components from other processes such as visbreaking, thermal cracking or catalytic cracking that are in this boiling range, or above, may also be considered.

In a preferred aspect the crude oil residues are from thermal cracking or atmospheric distillation that has been undertaken with processing conditions that have promoted cracking to increase gasoline and distillate production but have produced a residual component of higher density, higher aromatics and asphaltene content, and containing increased levels of coke.

The crude oil residue described herein, although normally useable in fuel oil blending or as feedstocks for other processes, have been rendered unusable by a combination of actual refinery processing originally undertaken and subsequent storage conditions. This may result in a high density, high boiling point material with up to/over 30% of associated asphaltene, carbon particles and other solid (sand etc). As such the residue is not directly usable as a fuel oil or fuel oil component because of the difficulties associated with handling, storage and distribution, combustion and blending.

In another aspect the crude oil residue may be materials that have accumulated as residues in tanks during distribution and storage of crude oil or heavy fuel oil products. An example is the sludge found in the bottom of marine fuel tanks.

The crude oil residue may be aged for a period from production such that it has been rendered unusable in fuel oil blending or as a feedstock For example, the crude oil residue may be aged for a period of up to 1 year from production, or for a period of up to 1 month from production, or for a period of at least 1 month from production, or for a period of at least 1 year from production, or for a period of at least 2 years from production, or for a period of at least 3 years from production, or for a period of at least 5 years from production, or for a period of at least 10 years from production, or for a period of at least 20 years from production or for a period of at least 50 years from production.

Process

As discussed herein in a broad aspect the present invention provides a process for the treatment of crude oil or aged crude oil residue comprising the steps of (a) contacting the oil or residue with a phenol resin and with a diluent, to provide a diluted phenol resin treated oil or residue; and (b) optionally removing solid material from the diluted phenol resin treated oil or residue.

In one aspect an aged crude oil residue is treated. Thus there is provided a process for the treatment of aged crude oil residue comprising the steps of (a) contacting the residue with a phenol resin and with a diluent, to provide a diluted phenol resin treated residue; and (b) optionally removing solid material from the diluted phenol resin treated residue.

In one aspect crude oil is treated. Thus there is provided a process for the treatment of crude oil comprising the steps of (a) contacting the oil with a phenol resin and with a diluent, to provide a diluted phenol resin treated oil; and (b) optionally removing solid material from the diluted phenol resin treated oil.

The phenol resin may be added to the oil or residue before addition of the diluent, after addition with the diluent, together with the diluent or combinations thereof. If the phenol resin and the diluent are contacted with the oil or residue simultaneously, the phenol resin and the diluent may be contacted separately, in combination or both.

In one preferred aspect the present invention provides a process comprising the steps of
(a) contacting the oil or residue with the phenol resin to provide a phenol resin treated oil or residue
(b) combining the phenol resin treated oil or residue with the diluent to provide a diluted phenol resin treated oil or residue; and
(c) optionally removing solid material from the diluted phenol resin treated oil or residue.

In one preferred aspect the present invention provides a process comprising the steps of
(a) combining the phenol resin and diluent
(b) contacting the combined phenol resin and diluent with the oil or residue to provide a diluted phenol resin treated oil or residue, and
(c) optionally removing solid material from the diluted phenol resin treated oil or residue.

In one preferred aspect the present invention provides a process comprising the steps of
(a) contacting the oil or residue with phenol resin to provide a treated oil or residue
(b) separately to step (a), combining phenol resin and diluent to provide a diluted phenol resin
(c) combining the treated oil or residue and the diluted phenol resin to provide a diluted phenol resin treated oil or residue; and
(d) optionally removing solid material from the diluted phenol resin treated oil or residue.

In one preferred aspect then the oil or residue is contacted with the phenol resin (either alone or in combination with the diluent) it is heater and/or agitated.

As noted herein the removal of solid material from the diluted phenol resin treated oil or residue is optional. In a preferred aspect this removal is performed. Preferably the solid materials are removed by filtration.

In one preferred aspect when the oil or residue is contacted with the phenol resin (either alone or in combination with the diluent) the oil or residue is at a temperature of 60-100° C.

In one preferred aspect when the diluent is contacted with the oil or residue resin (either alone or in combination with the phenol resin) the diluent is at a temperature of 60-100° C.

In one preferred aspect the diluted oil or residue or the diluted phenol resin treated oil or residue is heated to a temperature of 80-110° C. for a period of 10 to 240 minutes.

In one preferred aspect the diluted oil or residue or the diluted phenol resin treated oil or residue is heated to a temperature of 80-110° C. for a period of 90 to 150 minutes.

In one preferred aspect the diluted phenol treated oil or residue is cooled prior to removal of solids.

Phenol Resin

In one aspect the phenol resin is a compound of Formula I

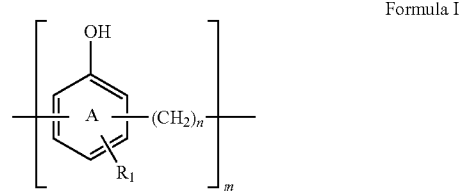

Formula I wherein m is at least 1; wherein n is at least 1; wherein the or each $R_1$ is selected from alkyl groups, aromatic groups and heterocycles, and wherein ring A is optionally further substituted with groups selected from —OH, hydrocarbyl groups, oxyhydrocarbyl groups, —CN, —NO$_2$, —SO$_3$H, —SO$_2$H, —COOH, —COOR$_4$, —NH$_2$, —NHR$_5$, —SO$_2$NH$_2$, —SO$_2$, —NHR$_6$, CONH$_2$, CONHR$_7$, SH and halogens; wherein each of R$_4$, R$_5$. R$_6$ and R$_7$ is independently selected from hydrocarbyl groups.

In one preferred aspect m is greater than 1. In one preferred aspect, m is 1 to 50, such as 1 to 40, 5 to 30, or 10 to 20. In a preferred aspect, m is 11 to 15.

n may be any suitable integer. For example n may be from 1 to 10 such as 1 to 8, 1 to 5 or 1, 2 or 3. Preferably n is 1.

In one aspect the "linker" group may be branched. Thus in this aspect the phenol resin may be a compound of Formula Ia

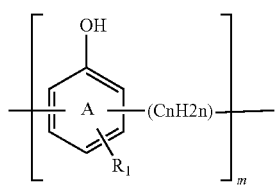

Formula Ia wherein m is at least 1; wherein n is at least 1; wherein the or each R$_1$ is selected from alkyl groups, aromatic groups and heterocycles, and wherein ring A is optionally further substituted with groups selected from —OH, hydrocarbyl groups, oxyhydrocarbyl groups, —CN, —NO$_2$, —SO$_3$H, —SO$_2$H, —COOH, —COOR$_4$, —NH$_2$, —NHR$_5$, —SO$_2$NH$_2$, —SO$_2$, —NHR$_6$, CONH$_2$, CONHR$_7$, SH and halogens; wherein each of R$_4$, R$_5$. R$_6$ and R$_7$ is independently selected from hydrocarbyl groups.

R$_1$ may be a linear or branched alkyl group.

In one aspect, preferably R$_1$ is a C$_1$-C$_{200}$ alkyl group, preferably a C$_1$-C$_{150}$ alkyl group, preferably a C$_{10}$-C$_{100}$ alkyl group, preferably a C$_1$-C$_{80}$ alkyl group, preferably a C$_1$-C$_{50}$ alkyl group, preferably a C$_1$-C$_{20}$ alkyl group, preferably a C$_5$-C$_{20}$ alkyl group, preferably a C$_5$-C$_{15}$ alkyl group, preferably a C$_6$-C$_{12}$ alkyl group, preferably a C$_7$-C$_{11}$ alkyl group, preferably a C$_8$-C$_{10}$ alkyl group, more preferably a C$_9$ alkyl group.

In one aspect, R$_1$ is a branched alkyl group, preferably a C$_{3-6}$ branched alkyl group, for example t-butyl.

In one aspect, R$_1$ is a straight chain alkyl group.

In one aspect, preferably R$_1$ is a C$_1$-C$_{200}$ straight chain alkyl group, preferably a C$_1$-C$_{150}$ straight chain alkyl group, preferably a C$_{10}$-C$_{100}$ straight chain alkyl group, preferably a C$_1$-C$_{80}$ straight chain alkyl group, preferably a C$_1$-C$_{50}$ straight chain alkyl group, preferably a C$_1$-C$_{20}$ straight chain alkyl group, preferably a C$_5$-C$_{20}$ straight chain alkyl group, preferably a C$_5$-C$_{15}$ straight chain alkyl group, preferably a C$_6$-C$_{12}$ straight chain alkyl group, preferably a C$_7$-C$_{11}$ straight chain alkyl group, preferably a C$_8$-C$_{10}$ straight chain alkyl group, more preferably a C$_9$ straight chain alkyl group.

In one preferred aspect R$_1$ is para substituted relative to the OH group.

In one preferred aspect the (CH$_2$)$_n$ group is ortho substituted relative to the OH group.

Preferably R$_1$ is para substituted relative to the OH group and the (CH$_2$)$_n$ group is ortho substituted relative to the OH group.

It will appreciated by one skilled in the art that the each of the "units" of Formula I may contain one or more further substituents. The "units" of Formula I independently of each other may be optionally substituted. As discussed herein ring A is optionally further substituted with groups selected from —OH, hydrocarbyl groups, oxyhydrocarbyl groups, —CN, —NO$_2$, —SO$_3$H, —SO$_2$H, —COOH, —COOR$_4$, —NH$_2$, —NHR$_5$, —SO$_2$NH$_2$, —SO$_2$, —NHR$_6$, CONH$_2$, CONHR$_7$, SH and halogens; wherein each of R$_4$, R$_5$. R$_6$ and R$_7$ is independently selected from hydrocarbyl groups. In a preferred aspect at least one of the "units" is unsubstituted. In a further preferred aspect each of the "units" is unsubstituted.

Thus, in one aspect, the compound of Formula I is a compound of Formula II

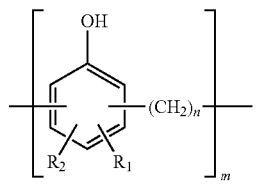

Formula II wherein the or each R$_2$ is an optional group independently selected from —OH, hydrocarbyl groups, oxyhydrocarbyl groups, —CN, —NO$_2$, —SO$_3$H, —SO$_2$H, —COOH, —COOR$_4$, —NH$_2$, —NHR$_5$, —SO$_2$NH$_2$, —SO$_2$, —NHR$_6$, CONH$_2$, CONHR$_7$, SH and halogens; wherein each of R$_4$, R$_5$. R$_6$ and R$_7$ is independently selected from hydrocarbyl groups; and wherein m, n and R$_1$ are as herein defined.

In a further aspect the compound is a compound of Formula IIa

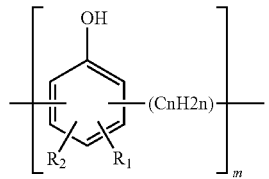

Formula IIa wherein the or each R$_2$ is an optional group independently selected from —OH, hydrocarbyl groups, oxyhydrocarbyl groups, —CN, —NO$_2$, —SO$_3$H, —SO$_2$H, —COOH, —COOR$_4$, —NH$_2$, —NHR$_5$, —SO$_2$NH$_2$, —SO$_2$, —NHR$_6$, CONH$_2$, CONHR$_7$, SH and halogens; wherein each of R$_4$, R$_5$. R$_6$ and R$_7$ is independently selected from hydrocarbyl groups; and wherein m, n and R$_1$ are as herein defined.

Thus, in one aspect, the compound of Formula I is a compound of Formula III

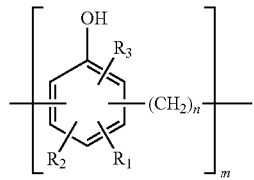

Formula III wherein the or each R$_2$ and R$_3$ is an optional group independently selected from —OH, hydrocarbyl groups, oxyhydrocarbyl groups, —CN, —NO$_2$, —SO$_3$H, —SO$_2$H, —COOH, —COOR$_4$, —NH$_2$, —NHR$_5$, —SO$_2$NH$_2$, —SO$_2$, —NHR$_6$, CONH$_2$, CONHR$_7$, SH and halogens; wherein each of R$_4$, R$_5$. R$_6$ and R$_7$ is independently selected from hydrocarbyl groups; and wherein m, n and R$_1$ are as herein defined.

In a further aspect the compound is a compound of Formula IIIa

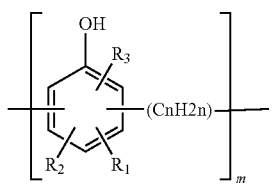

Formula IIIa wherein the or each $R_2$ and $R_3$ is an optional group independently selected from —OH, hydrocarbyl groups, oxyhydrocarbyl groups, —CN, —NO$_2$, —SO$_3$H, —SO$_2$H, —COOH, —COOR$_4$, —NH$_2$, —NHR$_5$, —SO$_2$NH$_2$, —SO$_2$, —NHR$_6$, CONH$_2$, CONHR$_7$, SH and halogens; wherein each of $R_4$, $R_5$. $R_6$ and $R_7$ is independently selected from hydrocarbyl groups; and wherein m, n and $R_1$ are as herein defined.

In these aspects preferably $R_2$ and/or $R_3$ is an optional hydrocarbon group, more preferably an optional linear or branched alkyl group.

The term "hydrocarbon" as used herein means any one of an alkyl group, an alkenyl group, an alkenyl group, an acyl group, which groups may be linear, branched or cyclic, or an aryl group. The term hydrocarbon also includes those groups but wherein they have been optionally substituted. If the hydrocarbon is a branched structure having substituent(s) thereon, then the substitution may be on either the hydrocarbon backbone or on the branch; alternatively the substitutions may be on the hydrocarbon backbone and on the branch.

In this aspect, preferably $R_2$ and/or $R_3$ is an optional group independently selected from a $C_1$-$C_{50}$ group, preferably a $C_1$-$C_{40}$ group, preferably a $C_1$-$C_{30}$ group, preferably a $C_1$-$C_{25}$ group, preferably a $C_1$-$C_{15}$ group.

A typical example of $R_2$ or $R_3$ is a tertiary alkyl group, such as a tertiary butyl group.

In a preferred aspect each of $R_2$ and $R_3$ are present such that ring A is fully substituted.

Preferably wherein ring A is optionally further substituted with groups selected from —OH, hydrocarbyl groups, oxyhydrocarbyl groups, —CN, —NO$_2$, —SO$_3$H, —SO$_2$H, —COOH, —COOR$_4$, —NH$_2$, —NHR$_5$, —SO$_2$NH$_2$, —SO$_2$, —NHR$_6$, CONH$_2$, CONHR$_7$, SH and halogens; wherein each of $R_4$, $R_5$. $R_6$ and $R_7$ is independently selected from hydrocarbyl groups.

In a preferred aspect the phenol resin is a substituted phenol resin. More preferably the phenol resin is the reaction product of substituted phenol and an aldehyde.

More preferably the phenol resin is the reaction product of substituted phenol and an aldehyde having 1-7 carbon atoms, for example formaldehyde.

In a preferred aspect the phenol resin is a nonyl phenol resin. More preferably the phenol resin is the reaction product of nonyl phenol and formaldehyde, or of t-butyl phenol and an aldehyde having 1-7 carbon atoms, for example formaldehyde.

Alkoxylated phenol resins (ethoxylated and/or propoxylated) are available. Their use is not excluded, but it is not preferred, as excellent results have been obtained using non-alkoxylated phenol resins.

The phenol resin may be contacted with the oil or residue in any suitable amount. Preferably the phenol resin is contacted with the oil or residue in an amount of 2 to 10,000 ppm based on the amount of oil or residue, such as in an amount of 5 to 5,000 ppm based on the amount of oil or residue, such as in an amount of 10 to 2,000 ppm based on the amount of oil or residue, or in an amount of 50 to 400 ppm based on the amount of oil or residue, or in an amount 200 to 350 ppm based on the amount of oil or residue.

Diluent

The diluent may be any suitable diluent

Typically the diluent is a crude oil distillation product selected from kerosene, cracked gas oil, vacuum gas oil, long residue, short residue, heavy naptha, light gas oil, medium gas oil, heavy gas oil, cycle oil, gasoline, diesel and mixtures thereof.

Preferably the diluent is a vacuum gas oil. In one preferred aspect the diluent is a light vacuum gas oil. By the term "light vacuum gas oil" it is typically meant a gas oil fraction from a vacuum distillation tower, which will typically have a boiling range of 350-630° C.

Further Aspects

In a further aspect the present invention provides a treated crude oil or a treated aged crude oil residue prepared by a process as defined herein.

In a further aspect the present invention provides a treated crude oil or a treated aged crude oil residue obtainable by a process as defined herein.

In a further aspect a fuel (such as a residual fuel oil, boiler fuel or marine fuel) comprising treated crude oil or treated aged crude oil residue prepared by or obtainable a process as defined herein.

The fuel of the present invention (such as a residual fuel oil) typically has a density at 15° C. of no greater than 1010 kg/m$^3$, for example 960 kg/m$^3$.

The fuel of the present invention (such as a residual fuel oil) typically has a pour point of no greater than 30° C., for example –14° C.

The fuel of the present invention (such as a residual fuel oil) typically has a flash point of at least 60° C., for example 129° C.

The fuel of the present invention (such as a residual fuel oil) typically has a sulphur content of no greater than 5 wt % for marine bunkers, or no greater than 3.5 wt % for land use.

The fuel of the present invention (such as a residual fuel oil) typically has a water content of no greater than 1% vol, for example no greater than 0.1% vol.

The fuel of the present invention (such as a residual fuel oil) typically has a viscosity at 100° C. of 5 to 50 mm$^2$/s, for example a viscosity at 50° C. of 42 mm$^2$/s.

The present invention further provides use of a phenol resin for increasing the stability of a crude oil or an aged crude oil residue.

The present invention further provides use of a phenol resin for increasing the stability of asphaltenes in a crude oil or an aged crude oil residue.

The present invention will now be described in further detail in the following examples.

EXAMPLE 1

Testing Methology

A testing methology was devised which modelled the process used to recover aged crude oil residue and thus test the efficacy of additives.

The full scale process involves heating the residual pitch and moving to a blending vessel, blending in two stages with additive and diluents, filtration sludge removal and cooling.

The test methology used was as follows
1. Heat the pitch to 80° C., stir
2. Add the additive to the pitch 3. Heat the diluent (e.g. light vacuum gas oil) and add to the pitch at 80° C.
4. Stir the mixture and raise the temperature to 100° C.
5. Maintain temperature for 30 minutes with stirring
6. Raise the temperature to 120° C., maintain for 30 minutes with stirring.
7. Cool to 95° C. and filter through a 75 micron filter sieve.
8. Test stability reserve of the oil by measuring separability number, ASTM D7061
9. Store the recovered heavy fuel oil blend at 45° C. for up to 30 days and test stability reserve using ASTM D7061.

Residue

The aged crude oil residue to be treated is residual pitch spread across a refinery with a pitch pond which has aged for 60+ years. The pitch is basically the residue after thermal cracking which followed a simple distillation and has the following properties:
Ash 0.7%
Asphaltenes 14.4%
Conradson Carbon Residue (CCR) 20.3%
Density 1.097
Fire point 230° C.
Heating Value 9335 kcal/kg,
Particle count NAS 1638
Pour point 30° C.
Sediment 3.63%
Sulphur 5.1%
Viscosity above 500000 cst @ 50° C.
Water 0.82%
Pb 13 ppm
Al 19 ppm
Si 41 ppm
Na 150 ppm,
Mo 17 ppm.

Additives

Additive 1—1:1 mix of resin A (below) and an oxyalkylated fatty amine. These 2 components are present at ~16% individually in the mix.
Additive 2—phenol resin A (below) at 38 wt. % active ingredient of Phenol resin A.
Additive 3—Similar to Additive 1 but further containing iron tallate. The materials are present in amounts of (i) 16 vol % resin A, (ii) 16 vol % oxyalkylated fatty amine (to provide 16 vol % active material in total since both are 50% concentration) and (iii) 50 vol % iron tallate.
Additive 4—phenol resin B (below) at 38 wt. % active ingredient of Phenol resin B
Additive 5—phenol resin B (below) at 55.8 wt. % active ingredient of Resin B.
Resin A—50 wt. % active, nonyl phenol resin with $CH_2$ bridge+an ethylene oxide/propylene oxide polymeric component.
Mn 2468, Mw 3823, pd 1.55
Resin B—~70 wt. % active, nonyl phenol resin with $CH_2$ bridge.
Mn 2680, Mw 3348, pd 1.74

Results

Pitch residue was blended with light vacuum gas oil at a ratio of 1:1. The residue is diluted with Light Vacuum Gas Oil (LVGO) of 7 CST received directly from refinery.

| Additive | Total treat rate/ppm | Separability no. - Day 1 | | Separability no. - Day 15 | | Separability no. - Day 30 | |
|---|---|---|---|---|---|---|---|
| None | 0 | 7.5 | 7.2 | 8.4 | 8.2 | 11.1 | 11.4 |
| Additive 1 | 400 | 0.08 | 0.08 | 3.22 | 3.38 | 5.5 | 5.3 |
| Additive 2 | 400 | 0.11 | 0.14 | 0.20 | 0.28 | 1.12 | 1.14 |
| Additive 3 | 400 | 0.16 | 0.12 | 4.1 | 4.1 | 6.7 | 6.8 |

-continued

| Additive | Total treat rate/ppm | Separability no. - Day 1 | | Separability no. - Day 15 | | Separability no. - Day 30 | |
|---|---|---|---|---|---|---|---|
| Additive 4 | 400 | 0.08 | 0.08 | 0.15 | 0.16 | 0.93 | 0.96 |
| Additive 5 | 400 | 0.07 | 0.07 | 0.07 | 0.06 | 0.6 | 0.89 |

Separability number is a dimensionless parameter which measures the stability reserve of an oil.

When the separability number is between 0 and 5 the oil is considered to have high stability reserve and asphaltenes are not likely to flocculate. If the separability number is between 5 and 10 the stability reserve is much lower, and asphaltenes may flocculate if the oil is exposed to conditions such as storage, ageing or heating. If the separability number is greater than 10 the stability reserve is very low and flocculation of asphaltenes may already have started.

FURTHER EXAMPLES

In example 1 we assessed separability. In subsequent examples we tested the viscosity. Further, to evaluate the stability we provoked phase separation of the blended mixtures and studied the kinetics using a light scattering instrument.

In real use the fuel will be stored for 30 days at ~50° C. and to evaluate the stability behaviour of the blends over time we stored them in an oven at ~50° C. and checked whether and how much the phase separation changed over this time period.

In the further examples the pitch used was the same as in Example 1. Full characterising information about the additive(s) was not always known, but what is known is stated.

EXAMPLE 2

Checking Treat Rate

A testing methodology was devised to recover aged crude oil
Treat rates: 10, 100, 200, 500, 1000 and 2000 ppm phenol resin
Fuel: pitch+ light vacuum gas oil (LVGO)

We used a variety of treat rates in order to establish the minimum and maximum level of additive required to make the crude oil residue (pitch) and vacuum gas oil blend stable and useable. To monitor the stability we measured the separability number. When adding the additive in excess, no great further improvement was to be seen.

The fuel was aged by storing it in an oven at 45° C. for 30 days and the separability number was tested. This time period was chosen as it is representative of the storage time the fuel is stored in tanks in ships.

The test methodology used was as follows.
1) Diluent and pitch were heated to 80° C. for 1 hour with stirring
2) The phenol resin additive was added directly to the pitch
3) The pitch was then stirred every 5 minutes for 30 minutes at 80° C.
4) The diluent was then added to the pitch
5) The sample was stirred and heated at 90° C. for 30 minutes. Stirring every 30 minutes.
6) The sample was then filtered through a 80 micron filter sieve
7) The oil blends stability reserve was tested by measuring the separability number. ASTM D7067
8) The oil blends were then stored at 45° C. for 30 days. The separability number was tested at days throughout.
9) Viscosity of the oil blends were also tested initially The viscosity methodology was as follows.
Instrument T A Instruments AR2000 Rheometer
Measuring geometry—40 mm Parallel Plate
Gap—1000 micro meters
Peltier Plate—maintained at a temperature of 50° C.
1) Samples were kept at 50° C. to keep them in solution prior to being transferred by pipette to the rheometer plate.
2) a preshear dependant on the initial viscosity of the samples was applied to ensure that a homogeneous temperature gradient was achieved across the sample and the sample shear history was consistent.
3) a stress was then applied to the geometry that was consistent with maintaining the sample between the parallel plates of the geometry.
4) A run time of 300 minutes to ensure a stable viscosity.

All blended samples were aged in an oven for 30 days. The 30 day time period is similar to the time that the fuel remains in the tank of a ship. The samples were aged in an oven at 45 C and samples were regularly taken out (after 1, 10, 21 and 30 days) and the separability number was measured.

The additives used were Resin B from Example 1.
Results

| Sample | Total treat Rate/ ppm | Aging (Days) | Separability Number |
|---|---|---|---|
| Pitch and LVGO Blend (50:50) | No treatment | 1 | 3.7 |
| Pitch and LVGO Blend (50:50) | No treatment | 10 | 6.2 |
| Pitch and LVGO Blend (50:50) | No treatment | 21 | 4.5 |
| Pitch and LVGO Blend (50:50) | No treatment | 30 | 6.8 |
| Pitch and LVGO Blend (50:50) | 10 ppm Resin B | 1 | 0.19 |
| Pitch and LVGO Blend (50:50) | 10 ppm Resin B | 10 | 0.03 |
| Pitch and LVGO Blend (50:50) | 10 ppm Resin B | 21 | 0.45 |
| Pitch and LVGO Blend (50:50) | 10 ppm Resin B | 30 | 2.2 |
| Pitch and LVGO Blend (50:50) | 100 PPM Resin B | 1 | 0.04 |
| Pitch and LVGO Blend (50:50) | 100 PPM Resin B | 10 | 0.01 |
| Pitch and LVGO Blend (50:50) | 100 PPM Resin B | 21 | 0.04 |
| Pitch and LVGO Blend (50:50) | 100 PPM Resin B | 30 | 0.27 |
| Pitch and LVGO Blend (50:50) | 200 ppm Resin B | 1 | 0.01 |
| Pitch and LVGO Blend (50:50) | 200 ppm Resin B | 10 | 0.01 |
| Pitch and LVGO Blend (50:50) | 200 ppm Resin B | 21 | 0.06 |
| Pitch and LVGO Blend (50:50) | 200 ppm Resin B | 30 | 0.05 |
| Pitch and LVGO Blend (50:50) | 500 ppm Resin B | 1 | 0.01 |
| Pitch and LVGO Blend (50:50) | 500 ppm Resin B | 10 | 0.01 |
| Pitch and LVGO Blend (50:50) | 500 ppm Resin B | 21 | 0.01 |
| Pitch and LVGO Blend (50:50) | 500 ppm Resin B | 30 | 0.02 |
| Pitch and LVGO Blend (50:50) | 1000 ppm Resin B | 1 | 0.01 |
| Pitch and LVGO Blend (50:50) | 1000 ppm Resin B | 10 | 0.01 |
| Pitch and LVGO Blend (50:50) | 1000 ppm Resin B | 21 | 0.03 |
| Pitch and LVGO Blend (50:50) | 1000 ppm Resin B | 30 | 0.02 |
| Pitch and LVGO Blend (50:50) | 2000 ppm Resin B | 1 | 0.01 |
| Pitch and LVGO Blend (50:50) | 2000 ppm Resin B | 10 | 0.01 |
| Pitch and LVGO Blend (50:50) | 2000 ppm Resin B | 21 | 0.01 |
| Pitch and LVGO Blend (50:50) | 2000 ppm Resin B | 30 | 0.02 |

Viscosity Results

| Sample | Additive Treat rate ppm | Viscosity mPas | Conditions Applied Stress | Pre Shear Stress Pa |
|---|---|---|---|---|
| Pitch | N/A | 473 | 50 | 1000 |
| Pitch, LVGO 50:50 | N/A | 175 | 10 | 20 |
| Pitch, LVGO 50:50 | Resin B 500 ppm | 130 | 10 | 20 |

The base fuel alone is unusable due to its lack of mobility and being highly viscous. It can be seen that addition of diluent reduces viscosity; however the oil fuel/diluent blend is unstable as tested by separability number. Addition of additive stabilises the fuel and reduces viscosity again.

EXAMPLE 3

A test methology was devised to understand if blending of additive to the different components influenced the stability of the fuel. A treat rate of 500 ppm of Resin B of Example 1 was chosen as it is an effective treat rate to stabilise the fuel.

Resin B at the treat rate 500 ppm was added to fuel to diluent and to both.

Test Methology

The same experimental procedure was followed as that used in experiment 1 however additisation was made directly to the pitch or to the LVGO or 250 ppm to pitch and 250 ppm to LVGO.

All temperatures remained the same as in example 2.
Results

| Sample | Additive | Aging (days) | Separability Number |
|---|---|---|---|
| Pitch and LVGO Blend (50:50) | 250 ppm Resin B to pitch + 250 ppm Resin B to LVGO | 1 | 0.01 |
| Pitch and LVGO Blend (50:50) | 250 ppm Resin B to pitch + 250 ppm Resin B to LVGO | 10 | 0.01 |
| Pitch and LVGO Blend (50:50) | 250 ppm Resin B to pitch + 250 ppm Resin B to LVGH | 21 | 0.01 |
| Pitch and LVGO Blend (50:50) | 250 ppm Resin B to pitch + 250 ppm Resin B to LVGO | 30 | 0.15 |
| Pitch and LVGO Blend (50:50) | 500 ppm Resin B to pitch | 1 | 0.01 |
| Pitch and LVGO Blend (50:50) | 500 ppm Resin B to pitch | 10 | 0.01 |

-continued

| Sample | Additive | Aging (days) | Separability Number |
|---|---|---|---|
| Pitch and LVGO Blend (50:50) | 500 ppm Resin B to pitch | 21 | 0.01 |
| Pitch and LVGO Blend (50:50) | 500 ppm Resin B to pitch | 30 | 0.02 |
| Pitch and LVGO Blend (50:50) | 500 ppm Resin B to LVGO | 1 | 0.01 |
| Pitch and LVGO Blend (50:50) | 500 ppm Resin B to LVGO | 10 | 0.02 |
| Pitch and LVGO Blend (50:50) | 500 ppm Resin B to LVGO | 21 | 0.01 |
| Pitch and LVGO Blend (50:50) | 500 ppm Resin B to LVGO | 30 | 0.05 |

EXAMPLE 4

The idea behind this example was to investigate the effect of varying the diluents from LVGO to gasoline and diesel. These experiments were carried out initially using the Pitch and latterly another fuel oil (see example 5).
Treat rate—500 ppm added to three heavy fuel oils diluted with three different lighter fuels
Diluents—vacuum gas oil, light gas oil, and diesel in order to vary aromaticity.
  Steps 1 to 4 were followed as in example 2. Steps 5-8 were:
  5) Sample was stirred and heated at 40° C. for 30 minutes. Stirring every 5 minutes.
  6) Sample was then filtered through a 80 micron filter sieve
  7) The oil blends stability reserve was tested by measuring the separability number. ASTM D7067
  8) The oil blends were then stored at 45° C. for 30 days. The separability number was tested at days throughout.
The additive was Resin B of example 1.

| Sample | Additive | Aging (days) | Separability Number |
|---|---|---|---|
| Diesel and pitch blend 50:50 | None | 1 | 2.81 |
| Diesel and pitch blend 50:50 | None | 10 | 3.87 |
| Diesel and pitch blend 50:50 | None | 21 | 2.97 |
| Diesel and pitch blend 50:50 | None | 30 | 5.7 |
| Diesel and pitch blend 50:50 | 500 ppm Resin B | 1 | 0.01 |
| Diesel and pitch blend 50:50 | 500 ppm Resin B | 10 | 0.02 |
| Diesel and pitch blend 50:50 | 500 ppm Resin B | 21 | 0.11 |
| Diesel and pitch blend 50:50 | 500 ppm Resin B | 30 | 3.3 |
| Gasoline and pitch blend 50:50 | None | 1 | 6.24 |
| Gasoline and pitch blend 50:50 | None | 10 | 5.6 |
| Gasoline and pitch blend 50:50 | None | 21 | 6 |
| Gasoline and pitch blend 50:50 | None | 30 | 7.82 |
| Gasoline and pitch blend 50:50 | 500 ppm Resin B | 1 | 0.14 |
| Gasoline and pitch blend 50:50 | 500 ppm Resin B | 10 | 0.04 |
| Gasoline and pitch blend 50:50 | 500 ppm Resin B | 21 | 0.04 |
| Gasoline and pitch blend 50:50 | 500 ppm Resin B | 30 | 0.62 |
| LVGO and pitch blend 50:50 | None | 1 | 3.68 |
| LVGO and pitch blend 50:50 | None | 10 | 6.15 |
| LVGO and pitch blend 50:50 | None | 21 | 4.39 |
| LVGO and pitch blend 50:50 | None | 30 | 6.7 |
| LVGO and pitch blend 50:50 | 500 ppm Resin B | 1 | 0.01 |
| LVGO and pitch blend 50:50 | 500 ppm Resin B | 10 | 0.01 |
| LVGO and pitch blend 50:50 | 500 ppm Resin B | 21 | 0.01 |
| LVGO and pitch blend 50:50 | 500 ppm Resin B | 30 | 0.05 |

Viscosity Results
  Analysis undertaken at 50° C.

| | | Conditions | | |
|---|---|---|---|---|
| Sample | Additive Treat rate ppm | Viscosity mPas | Applied Stress | Pre Shear Stress Pa |
| Pitch | N/A | 473 | 50 | 1000 |
| Pitch, LVGO 50:50 | N/A | 175 | 10 | 20 |
| Pitch, LVGO 50:50 | Resin B 500 ppm | 130 | 10 | 20 |
| Gasoline and pitch | | TWO PHASES | | |
| Gasoline and Pitch | Resin B 500 ppm | 25 | 5 | 20 |

The additive provides a stable consistent oil blend in gasoline

EXAMPLE 5

Banias Crude Oil, Checking Importance of Diluent

Another heavy fuel oil sample (from Banias Refinery Company) was used. This fuel was chosen to show the effect of fuel that had not been stored for as long as the pitch. It was also tested to provide evidence that our additives have the ability to stabilise different fuels. Again different diluents were used.
Test Methology
  The same Experimental procedure was followed as in example 2.
  The additive was Resin B of example 1.
Results

| Sample | Additive | Aging (days) | Separability Number |
|---|---|---|---|
| Banias fuel and diesel Blend (50:50) | None | 1 | 19.46 |
| Banias fuel and diesel Blend (50:50) | None | 10 | 24.2 |
| Banias fuel and diesel Blend (50:50) | None | 21 | 25.11 |
| Banias fuel and diesel Blend (50:50) | None | 30 | 25.2 |
| Banias fuel and gasoline Blend (50:50) | None | 1 | 12.7 |

-continued

| Sample | Additive | Aging (days) | Separability Number |
|---|---|---|---|
| banias fuel and gasoline Blend (50:50) | None | 10 | 15.5 |
| Banias fuel and gasoline Blend (50:50) | None | 21 | 26.2 |
| Banias fuel and gasoline Blend (50:50) | None | 30 | 25.6 |
| Banias fuel and LGVO Blend (50:50) | None | 1 | 11.2 |
| Banias fuel and LGVO Blend (50:50) | None | 10 | 19.7 |
| Banias fuel and LGVO Blend (50:50) | None | 21 | 17.3 |
| Banias fuel and LGVO Blend (50:50) | None | 30 | 16 |
| Banias fuel and diesel Blend (50:50) | 500 ppm of Resin B | 1 | 6 |
| Banias fuel and diesel Blend (50:50) | 500 ppm of Resin B | 10 | 6.6 |
| Banias fuel and diesel Blend (50:50) | 500 ppm of Resin B | 21 | 2.4 |
| Banias fuel and diesel Blend (50:50) | 500 ppm of Resin B | 30 | 5.5 |
| Banias fuel and gasoline Blend (50:50) | 500 ppm of Resin B | 1 | 3.65 |
| Banias fuel and gasoline Blend (50:50) | 500 ppm of Resin B | 10 | 3.6 |
| Banias fuel and gasoline Blend (50:50) | 500 ppm of Resin B | 21 | 1.9 |
| Banias fuel and gasoline Blend (50:50) | 500 ppm of Resin B | 30 | 3.55 |
| Banias fuel and LGVO Blend (50:50) | 500 ppm of Resin B | 1 | 9.1 |
| Banias fuel and LGVO Blend (50:50) | 500 ppm of Resin B | 10 | 2.8 |
| Banias fuel and LGVO Blend (50:50) | 500 ppm of Resin B | 21 | 3.8 |
| Banias fuel and LGVO Blend (50:50) | 500 ppm of Resin B | 30 | 8.2 |

Viscosity Results

Analysis was undertaken at 50° C.

| | | | Conditions | |
|---|---|---|---|---|
| Sample | Additive Treat rate ppm | Viscosity mPas | Applied Stress | Pre Shear Stress Pa |
| Banias LVGO | N/A | 83 | 50 | 200 |
| Banias LVGO 50:50 | FR59 500 ppm | 80 | 50 | 200 |

EXAMPLE 6

Evaluating the Performance of a Further Phenol Resin

Two phenol resins were tested in one heavy fuel oil (pitch) with one diluent (LVGO).

The same experimental procedure was followed as that used in example 2.

A further additive tested was Resin C-4 (1,1-dimethyl-ethyl)phenol formaldehyde resin)

Results

| Sample | Additive | Aging (days) | Separability Number |
|---|---|---|---|
| Pitch and LVGO Blend (50:50) | 500 ppm of Resin C to pitch | 1 | 0.03 |
| Pitch and LVGO Blend (50:50) | 500 ppm of Resin C to pitch | 10 | 0.08 |
| Pitch and LVGO Blend (50:50) | 500 ppm of Resin C to pitch | 21 | 0.02 |
| Pitch and LVGO Blend (50:50) | 500 ppm of Resin C to pitch | 30 | 0.03 |

The invention claimed is:

1. A process for the treatment of aged crude oil residue from crude oil refining, which has been aged by subsequent storage in the presence of air and which is unusable as a fuel oil or fuel oil component, the process comprising the steps of:
   (a) contacting the residue with a phenol resin and with a diluent, to provide a diluted phenol resin treated residue, wherein the diluent is a crude oil distillation product selected from the group consisting of: kerosene, cracked gas oil, vacuum gas oil, long residue, short residue, heavy naphtha, light gas oil, medium gas oil, heavy gas oil, cycle oil, gasoline, diesel and mixtures thereof.

2. The process according to claim 1, wherein said contacting of the residue with the phenol resin occurs first to provide a phenol resin treated residue and is followed by combining the phenol resin treated oil or residue with the diluent to provide a diluted phenol resin treated residue.

3. The process according to claim 1, wherein prior to step (a), is the step of combining the phenol resin and diluent.

4. The process according to claim 1 wherein aged crude oil residue is the residue of atmospheric distillation or thermal cracking of crude oil.

5. The process according to claim 1 wherein the aged crude oil residue is aged for a period from production such that it has been rendered unusable in fuel oil blending or as a feedstock.

6. The process according to claim 5 wherein the aged crude oil residue is aged for a period of at least 1 year from production.

7. The process according to claim 5 wherein the aged crude oil residue is aged for a period of at least 2 year from production.

8. The process according to claim 5 wherein the aged crude oil residue is aged for a period of at least 10 years from production.

9. The process according to claim 1 wherein the phenol resin is the reaction product of a phenol and an aldehyde.

10. The process according to claim 9 wherein the aldehyde is formaldehyde.

11. The process according to claim 1 wherein the phenol resin is a compound of Formula I

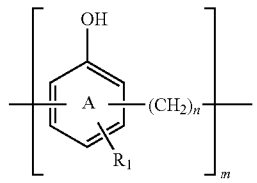

Formula I wherein m is at least 1; wherein n is at least 1; wherein the or each $R_1$ is selected from alkyl groups, aromatic groups and heterocycles, and wherein ring A is optionally further substituted with groups selected from —OH, hydrocarbyl groups, oxyhydrocarbyl groups, —CN, —$NO_2$, —$SO_3H$, —$SO_2H$, —COOH, —$COOR_4$, —$NH_2$, —$NHR_5$, —$SO_2NH_2$, —$SO_2$—$NHR_6$, $CONH_2$, $CONHR_7$, SH and halogens; wherein each of $R_4$, $R_5$, $R_6$ and $R_7$ is independently selected from hydrocarbyl groups.

12. The process according to claim 11 wherein n is 1.

13. The process according to claim 11 wherein $R_1$ is a $C_6$-$C_{12}$ alkyl group.

14. The process according to claim 13 wherein $R_1$ is a $C_9$ alkyl group.

15. The process according to claim 11 wherein $R_1$ is a straight chain alkyl group.

16. The process according to claim 1 wherein the phenol resin is a nonyl phenol resin.

17. The process according to claim 1 wherein the phenol resin is the reaction product of nonyl phenol and formaldehyde.

18. The process according to claim 1 wherein the phenol resin is contacted with the residue in an amount of 10 to 10,000 ppm based on the amount of residue.

19. The process according to claim 1 wherein the phenol resin is contacted with the residue in an amount of 10 to 2,000 ppm based on the amount of residue.

20. The process according to claim 1 wherein the phenol resin is contacted with the residue in an amount of 50 to 400 ppm based on the amount of residue.

21. The process according to claim 1 wherein the phenol resin is contacted with the residue in an amount 200 to 350 ppm based on the amount of residue.

22. The process according to claim 1 wherein the diluent is a vacuum gas oil.

23. A diluted phenol resin treated residue prepared by the process according to claim 1.

24. A residual oil, boiler fuel, marine fuel, Bunker C, blending components for bunker fuel or bitumen comprising the diluted phenol resin treated residue according to claim 23.

25. The process according to claim 1, wherein the stability of the aged crude oil residue is increased.

26. The process according to claim 25 wherein the stability of asphaltenes in the aged crude oil residue is increased.

27. The process according to claim 1 further comprising the step of removing solid material from the diluted phenol resin treated residue.

28. The process according to claim 27 wherein solid materials are removed by filtration.

* * * * *